United States Patent Office 2,870,225
Patented Jan. 20, 1959

2,870,225

1,2-DICHLOROETHANE

Stone D. Cooley and Frank B. Marcotte, Corpus Christi, Tex., assignors to Celanese Corporation of America, New York, N. Y., a corporation of Delaware No Drawing. Application December 29, 1954
Serial No. 478,486

8 Claims. (Cl. 260—662)

This invention relates to the production of 1,2-dichloroethane and relates more particularly to the production of dichloroethane by the reaction of chlorine and ethylene.

The production of 1,2-dichloroethane by the reaction of ethylene and chlorine has long been known to the art. However, the art has found it difficult to carry out this reaction without the production of relatively large quantities of undesired by-products, such as more highly chlorinated ethanes. To avoid the formation of substantial amounts of by-products it has been customary in the art to use temperatures not above 200° C., preferably well below 200° C.

An inexpensive source of one of the reactants, namely ethylene, is the mixture produced by the autothermic cracking of ethane or other aliphatic hydrocarbon in the presence of small amounts of oxygen, as described for example by Deanesly and Watkins in Chemical Engineering Progress, March 1951, pages 134 to 140 which discusses the autothermic cracking of a wide range of hydrocarbon stocks including propane, butane, or heavier stocks and shows the production of autothermic gases containing upwards of 12.5% by volume of ethylene. This mixture contains, besides the ethylene and minor amounts of other hydrocarbons and of inert diluents such as nitrogen, an appreciable proportion of hydrogen. For example, in one typical mixture produced in this manner the ethylene concentration is about 26 mole percent while the hydrogen concentration is 39 mole percent. The presence of the hydrogen makes it difficult to chlorinate the ethylene of such a mixture in an efficient manner at elevated temperatures to produce 1,2-dichloroethane, since, as is well known, hydrogen reacts violently with chlorine at elevated temperatures.

It is therefore an object of this invention to provide a new process for the efficient production of 1,2-dichloroethane and chlorine in the presence of hydrogen.

A further object of this invention is the provision of a novel process for producing 1,2-dichloroethane by the chlorination of ethylene derived from the oxidative cracking of ethane and containing appreciable amounts of hydrogen.

It is another object of this invention to provide a process for the production of 1,2-dichloroethane by the reaction of ethylene and chlorine at high temperature, i. e. temperatures above 200° C.

Still another object of this invention is the provision of a process for the production of 1,2-dichloroethane from ethylene and chlorine using short reaction times and obtaining such high conversions of the reactants and such high yields of the desired product that recycling of said reactants is economically unnecessary.

In accordance with one aspect of this invention we have found that the chlorination of mixtures containing ethylene and hydrogen can be carried out efficiently at elevated temperatures by the use, as the source of chlorine, of a mixture produced, according to the well known Deacon process, by the oxidation of hydrogen chloride with air. When such a chlorine-containing mixture is employed for the chlorination of ethylene in the presence of hydrogen at elevated temperatures the tendency for the chlorine to react with the hydrogen is substantially overcome and 1,2-dichloroethane is produced in excellent yields. The improved results obtained by the use of the chlorine-containing mixture produced by the reaction of oxygen and hydrogen chloride are believed to be due, in large part, to the presence of appreciable amounts of unreacted oxygen in said chlorine-containing mixture, the oxygen acting to inhibit the reaction between the chlorine and hydrogen. Preferably, there should be above 1% by volume of oxygen in the gaseous mixture undergoing chlorination.

In one preferred embodiment the reaction is carried out by continuously passing a mixture of the ethylene- and hydrogen-containing gas, produced by the cracking of ethane, and the chlorine- and oxygen-containing gas, produced by the reaction of oxygen and hydrogen chloride, over a suitable catalyst, preferably activated bauxite, at a temperature of above 200° C., preferably about 225 to 400° C.

Advantageously, in the production of the chlorine-containing gas used in the process of this invention there is employed a stoichiometric excess of oxygen over hydrogen chloride. Thus, although the equation

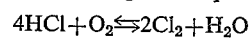

$$4HCl + O_2 \rightleftharpoons 2Cl_2 + H_2O$$

provides ¼ mole of oxygen for each mole of hydrogen chloride, we prefer to use an amount of air which provides about ⅓ mole of oxygen per mole of hydrogen chloride. This excess of oxygen causes a shift in the equilibrium so that more hydrogen chloride is converted to chlorine and at the same time provides a greater amount of oxygen in the products, which, as pointed out previously, is desirable in order to prevent the reaction between chlorine and hydrogen during the chlorination of the ethylene.

In the practice of this invention it is most advantageous to supply about one mole of chlorine per mole of ethylene. However, higher or lower proportions of chlorine may be used if desired. Also, although it is most convenient to carry out the reaction between the ethylene and the chlorine at atmospheric pressure, superatmospheric or subatmospheric pressures may be employed.

The reaction between chlorine and ethylene is exothermic and in the processes of the prior art it was necessary to cool the reacting mixture in order to avoid side-reactions at more elevated temperatures. In the process of this invention such cooling is unnecessary. However, it is often desirable to maintain the catalyst and the reactants passing thereover at a uniform temperature, as by circulating a suitable heat-transfer fluid around the reaction zone. It is of course advantageous to carry out the reaction at a temperature below that at which substantial degradation of the reactants or products is favored. If desired, the heat distribution may be such that the reaction is carried out in the initial, complete and continuous absence of any liquid phase in the reaction zone. For best results the time of contact between the reactants and the catalyst should be relatively short. For example, suitable contact times are 0.4 to 0.8 second.

The catalyst employed for the chlorination of the ethylene may be in the form of a fixed bed of granules thereof or, if desired, it may be employed in very finely divided fluidized form.

In the processes of the prior art it has been suggested that the presence of appreciable amounts of water is detrimental to the efficiency of the addition reaction between chlorine and ethylene. The process of this invention may be carried out without significant loss of efficiency in the presence of substantial amounts of water vapor. Hydrogen chloride, present in the chlorine-containing mixture obtained by the Deacon process, has been found not to interfere with the process, but rather to promote the efficiency thereof.

The following examples are given to illustrate this invention further.

*Example I*

A mixture of air and dry hydrogen chloride, said mixture containing one mole of oxygen for each three moles of hydrogen chloride, is passed continuously through a heated tube filled with granular pumice impregnated with a mixture of cupric chloride and sodium chloride, the temperature in the reactor being 450–510° C. 70% of the HCl is converted to chlorine, producing a mixture containing 14.5 mole percent of chlorine, 12.4 mole percent of hydrogen chloride, 52 mole percent of nitrogen, 6.6 mole percent of oxygen and 14.5 mole percent of water.

At the same time, ethane and air, both under pressure of 10 pounds per square inch gauge are preheated to 870° C. are combined in the ratio of two moles of ethane to one mole of air and are passed through a reactor heated to 940° C., the residence time in the reactor being 0.036 second. The product gases are passed through chilled water, where the small fraction of water-soluble oxygenated compounds is removed and some of the small quantity of heavy oils present is condensed, and then through glass wool lightly impregnated with lubricating oil where practically all of the remaining oily substances are removed. These oily substances, if not removed, would tend to deactivate the catalyst in the chlorinator described below and to produce an orange-brown crude chlorinated product. Thereafter the carbon dioxide is removed from the product gases by passing said gases through aqueous sodium hydroxide. The resulting scrubbed product gases contain 26.1 mole percent of ethylene, 38.7 mole percent of hydrogen, 15.4 mole percent of nitrogen, 9.3 mole percent of methane, 4.5 mole percent of ethane, 1.1 mole percent of acetylene, 2.0 mole percent of carbon monoxide, 1.0 mole percent of water and 0.3 mole percent of oxygen, in addition to small amounts of propylene, butadiene-1,3, benzene, carbon dioxide and argon.

The ethylene-containing mixture is fed continuously through a heated jacketed column filled with "Porocel" activated bauxite granules of 4 to 8 mesh particle size and of low iron content, the jacket of said column being filled with 2-ethyl hexanol maintained at its boiling temperature of 185° C. The chlorine-containing mixture is injected continuously into the bed of bauxite at several spaced points along the length of said bed. The contact time in the catalyst bed is 0.4 second, while the mixtures are fed to the catalyst bed at such a rate that 1.1 mole of chlorine is supplied per mole of ethylene. The resulting stream of products is then chilled to condense the chlorinated materials. 87% of the chlorine is converted to chlorinated products, 10% to hydrogen chloride and 3% remains unreacted. 82% of the ethylene is converted to chlorinated products, of which 86% by weight is 1,2-dichloroethane.

*Example II*

Example I is repeated except that in place of the ethylene-containing mixture made by the autothermic cracking of ethane there is employed a mixture of 1.1 moles of hydrogen and 1 mole of ethylene, the contact time of the reactants and the bauxite catalyst is 0.8 second and the maximum temperature of the catalyst bed is 280° C. Analysis of the products of chlorination shows that none of the hydrogen has reacted, the amount of hydrogen in the feed and in the products being the same. 91% of the ethylene is converted to 1,2-dichloroethane, 3% is unreacted, 3% is converted to higher boiling products and 3% to carbon oxides. 90% of the chlorine is converted to 1,2-dichloroethane and 7% to hydrogen chloride.

It is to be understood that the foregoing detailed description is merely given by way of illustration and that many variations may be made therein without departing from the spirit of our invention.

Having described our invention, what we desire to secure by Letters Patent is:

1. Process for the chlorination of the ethylene in a mixture produced by the cracking of an alkane and containing at least 12.5% by volume of ethylene, which comprises reacting, in the vapor phase, said mixture at an elevated temperature above 225° C. and below the temperature at which substantial degradation of the reactants or products is favored with a mixture of chlorine and oxygen in the presence of a catalyst for the additive chlorination of ethylene comprising activated bauxite to produce 1,2-dichloroethane, the amount of oxygen in the reaction mixture being above 1% by volume.

2. Process for the chlorination of the ethylene in a mixture containing hydrogen and at least about 26% by volume of ethylene produced by the autothermic cracking of ethane, which comprises reacting, in the vapor phase, said mixture at an elevated tmeperature above 225° C. and below the temperature at which substantial degradation of the reactants or products is favored, with a mixture of chlorine and oxygen in the presence of a catalyst for the additive chlorination of ethylene to produce 1,2-dichloroethane, there being above 1% by volume of oxygen in the reaction mixture.

3. Process as set forth in claim 2 in which said mixture of chlorine and oxygen is produced by the reaction of hydrogen chloride and excess air according to the Deacon process.

4. Process as set forth in claim 3 in which said catalyst is activated bauxite.

5. Process for the chlorination of ethylene, which comprises reacting a mixture comprising at least 12.5% by volume of ethylene, and containing chlorine, water, hydrogen chloride, nitrogen, hydrogen and above 1% by volume of oxygen in the vapor phase in the presence of activated bauxite at a temperature above 225° C. and below the temperature at which substantial degradation of the reactants or products is favored, to produce 1,2-dichloroethane.

6. Process for the chlorination of ethylene, which comprises continuously passing a mixture comprising at least 12.5% by volume of ethylene, and containing chlorine, water, hydrogen chloride, nitrogen, hydrogen and above 1% by volume of oxygen, in the vapor phase, said mixture containing about 1 mole of chlorine per mole of ethylene, into contact with activated bauxite at a temperature of about 225 to 400° C. to produce 1,2-dichloroethane.

7. Process which comprises autothermically cracking ethane by reacting it with a minor amount of air to produce a mixture comprising at least 12.5% by volume of ethylene and containing hydrogen, reacting hydrogen chloride and air to produce a mixture comprising chlorine, oxygen and hydrogen chloride, and continuously reacting said mixtures at an elevated temperature above 225° C. and below the temperature at which substantial degradation of the reactants or products is favored, in the presence of a catalyst for the additive chlorination of ethylene, comprising activated bauxite to produce 1,2-dichloroethane, there being above 1% by volume of oxygen in the reaction mixture undergoing chlorination.

8. Process which comprises autothermically cracking ethane by reacting it with a minor amount of air to produce a mixture comprising, as its principal constituents, ethylene and hydrogen and containing at least 12.5% by volume of ethylene, reacting hydrogen chloride and air to produce a mixture comprising chlorine, oxygen and hydrogen chloride and continuously reacting said mixtures at a temperature of 225° to 400° C. in the presence of activated bauxite to chlorinate said ethylene and so to produce 1,2-dichloroethane, the proportions of said mixtures being such that there is about one mole of chlorine per mole of ethylene and above 1% by volume of oxygen in the mixture undergoing chlorination.

References Cited in the file of this patent

UNITED STATES PATENTS

| | | |
|---|---|---|
| 1,262,769 | Garner et al. | Apr. 16, 1918 |
| 1,591,984 | Krause et al. | July 13, 1926 |
| 2,284,482 | Vaughn et al. | May 26, 1942 |
| 2,395,314 | Blumer | Feb. 19, 1946 |
| 2,658,087 | Landau et al. | Nov. 3, 1953 |
| 2,658,088 | Landau et al. | Nov. 3, 1953 |

FOREIGN PATENTS

| | | |
|---|---|---|
| 443,020 | Germany | Apr. 19, 1927 |